United States Patent
Yang et al.

(10) Patent No.: US 9,406,956 B2
(45) Date of Patent: Aug. 2, 2016

(54) CLOSED LOOP TYPE FUEL CELL SYSTEM WITH UNREACTED MATERIAL REMOVING FUNCTION

(75) Inventors: Cheol Nam Yang, Gyeongsangnam-do (KR); Chang Rae Lee, Gyeongsangnam-do (KR)

(73) Assignee: KOREA INSTITUTE OF MACHINERY & MATERIALS, Daejon (KR)

( * ) Notice: Subject to any disclaimer, the term of this patent is extended or adjusted under 35 U.S.C. 154(b) by 829 days.

(21) Appl. No.: 13/087,711

(22) Filed: Apr. 15, 2011

(65) Prior Publication Data

US 2011/0294023 A1 Dec. 1, 2011

(30) Foreign Application Priority Data

May 27, 2010 (KR) ........................ 10-2010-0049428

(51) Int. Cl.
*H01M 8/06* (2016.01)
*H01M 8/04* (2016.01)

(52) U.S. Cl.
CPC .............. *H01M 8/06* (2013.01); *H01M 8/0438* (2013.01); *H01M 8/04097* (2013.01); *H01M 8/04164* (2013.01); *H01M 8/04552* (2013.01); *H01M 8/04559* (2013.01); *H01M 8/04753* (2013.01); *H01M 8/04761* (2013.01); *H01M 8/0662* (2013.01); *Y02E 60/50* (2013.01)

(58) Field of Classification Search
CPC .................... H01M 8/04097; H01M 8/04164; H01M 8/0438; H01M 8/04552; H01M 8/04559; H01M 8/04753; H01M 8/04761; H01M 8/06; H01M 8/0662; Y02E 60/50
USPC .................................. 429/410, 413, 414, 450
See application file for complete search history.

(56) References Cited

FOREIGN PATENT DOCUMENTS

| JP | 09-180743 A | 7/1997 |
|---|---|---|
| JP | 2008-251312 A | 10/2008 |
| KR | 10-0923448 B1 | 10/2009 |
| KR | 10-0923448 B1 * | 10/2009 .............. H01M 8/04 |

OTHER PUBLICATIONS

Office Action dated Feb. 7, 2013 in Japanese Application No. 2011-095483, filed Apr. 21, 2011.
Office Action dated Apr. 11, 2011 in Korean Application No. 10-2010-0049428 filed May 27, 2010.

* cited by examiner

*Primary Examiner* — Carlos Barcena
(74) *Attorney, Agent, or Firm* — Saliwanchik, Lloyd & Eisenschenk (57) ABSTRACT

A closed loop type fuel cell system performs a removal function for an oxidant and a reductant, which are unreacted material, including a recirculating component for recirculating the oxidant and the reductant discharged from the main fuel cell back into the main fuel cell; and a regenerating component for removing moisture produced during the operation of the main fuel cell and impurities contained in the recirculated oxidant and reductant.

10 Claims, 5 Drawing Sheets

CLOSED LOOP TYPE FUEL CELL SYSTEM WITH UNREACTED MATERIAL REMOVING FUNCTION

CROSS-REFERENCE TO RELATED APPLICATION

This application claims the benefit under 35 U.S.C. §119 of Korean Application No. 10-2010-0049428, filed May 27, 2010, which is hereby incorporated by reference in its entirety.

BACKGROUND OF THE DISCLOSURE

1. Field of the Invention

The present invention relates to a closed loop type fuel cell system with unreacted material removing function, including a recirculating means recirculating unreacted material, such as an oxidant and a reductant, discharged from the main fuel cell back into the main fuel cell; a regenerating means for removing moisture and impurities inside the main fuel cell; and an exhausting means for drawing out the oxidant and the reductant, which are unreacted materials existing inside the regenerating means.

2. Description of Related Art

A fuel cell refers to a system that generates electricity through the reaction of oxygen and fuel (LNG, LPG, hydrogen, methanol, etc.), and simultaneously produces water and heat as by-products. It is an electricity generating device with high electric-generating efficiency and with environmentally harmful substances removed.

And, as to the type of the electrolyte used, there exist a PEMFC (Polymer Electrolyte Membrane Fuel Cell), a DMFC (Direct Methanol Fuel Cell), a PAFC (Phosphoric Acid Fuel Cell), an MCFC (Molt Carbonate Fuel Cell), and a SOFC (Solid Oxide Fuel Cell).

Of such types of fuel cells, PEMFC, PAFC and DMFC are low in operating temperature, each having about 80° C. to 120° C., 190° C. to 200° C., and 25° C. to 90° C., respectively. These are highly available as a power source for a transportation vehicle (for example, automobiles), a house equipment or appliance and portable devices.

Therefore, in order to promote and expand the commercialization of these fuel cells, research attention is focused on the miniaturization, and reducing weight and cost of an entire fuel cell system.

However, since the production of reactants is excessive, and supplying gas into the catalyst layer and diffusing proton into a polymer membrane are prohibited due to a plethora of moisture, in form of water droplets, produced within the operating environment of a high-current area inside a fuel cell, a lowering of fuel cells' performance is observed.

As a more significant problem, a partial cell performance drop on account of uneven water distribution per a unit cell existing in a fuel cell makes it difficult to perform a normal operation.

As such, considering the occurrence of excessive moisture in a fuel cell, referred to as flooding, is an important factor causing the lowering of reaction efficiency, and that it makes the secure operation of fuel cells difficult, it is desperately necessary to discharge excessive moisture out of a fuel cell.

Hence, Korean Intellectual Property Office Patent No. 0509818 discloses "a method and an apparatus for performing an interior purge in a fuel cell system."

Briefly referring to the prior-art technology, it is configured to possibly detect the voltage of a plurality of cells; purge a moisture and gas mixture, which is existing inside a stack, out of the stack using a pressure difference by controlling a purge valve and a recirculation pump upon a flooding occurrence; and re-supply the gas separated from the moisture back into the stack.

However, such a prior-art technology encompasses following problems.

Firstly, since a fuel purity supplied into a fuel cell fails to reach 100%; and thus, even if the gas separated from the moisture is re-supplied into the fuel cell, impurities stock up inside the fuel cell, lowering generation efficiency.

Also, when carbon, constructing a bipolar plate and an electrode, and impurities such as a metal ion and particles of a peripheral apparatus composing a fuel cell, stock up inside the fuel cell, gradually influencing the durability of the fuel cell as well as producing a current leakage inside it. Consequently, this causes a lifetime shortening or breakage of the fuel cell and produces an enormous repair cost, which seems to be undesirable.

In addition, since a closed circuit is constructed, even if moisture produced in a fuel cell is removed by recirculating gas inside the fuel cell using a conventional technology, impurities influx inside the fuel cell again by means of the gas supplied into the fuel cell, lowering the performance and durability of fuel cells.

BRIEF SUMMARY

To solve such a problem, an objective of the present invention is directed to provide a closed loop type fuel cell system with unreacted material removing function, which includes a recirculating means recirculating unreacted material, such as an oxidant and a reductant, discharged from the main fuel cell, back into the main fuel cell; a regenerating means for removing moisture produced during the operation of a main fuel cell and impurities contained in the recirculated oxidant and reductant; and an exhausting means for drawing out the oxidant and the reductant, which are unreacted materials existing inside the regenerating means.

Another objective of the invention is to provide a closed loop type fuel cell system with unreacted material removing function, configured to selectively communicate one side of the recirculating means and one side of the regenerating means thereby to simultaneously generate electricity from the main fuel cell and purge moisture and impurities.

Another objective of the invention is to provide a closed loop type fuel cell system with unreacted material removing function, configured to selectively replace a sacrificial fuel cell provided in the regenerating means in order to inhibit decrease in the main fuel cell's electricity generating efficiency and so as to keep it from early breakage.

Another objective of the invention is to provide a closed loop type fuel cell system with unreacted material removing function that blocks the discharge of unreacted oxidant and reductant in order to inhibit unwanted accident such as explosion in the future.

A closed loop type fuel cell system with unreacted material removing function of the present invention includes a main fuel cell that enables reaction between an oxidant and a reductant to generate electricity; a supply means supplying material that contains an oxidant and a reductant to the main fuel cell; a recirculating means recirculating unreacted material that is discharged from the main fuel cell back into the main fuel cell; a detecting means detecting voltages of a plurality of cells that compose the main fuel cell; a regenerating means selectively communicating to one side of the main fuel cell to remove moisture and impurities inside the main fuel cell; an exhausting means circulating unreacted material remnant inside the regenerating means to exhaust the unreacted material; and a control means controlling actions of the supply means, the recirculating means, the detecting means, the regenerating means, and the exhausting means.

The regenerating means includes a sacrificial fuel cell that enables reaction between an oxidant and a reductant, which are unreacted materials provided from the main fuel cell, to generate electricity.

The exhausting means recirculates unreacted material passed through the sacrificial fuel cell back into the sacrificial fuel cell.

The exhausting means includes an exhauster storing or extinguishing electricity generated in the sacrificial fuel cell to exhaust the oxidant and the reductant inside the sacrificial fuel cell; a collecting pipe guiding unreacted material coming out from the sacrificial fuel cell back into the sacrificial fuel cell; a purge pipe branching from the collecting pipe and selectively opening the inner part of the sacrificial fuel cell; a pressure gauge measuring pressure inside the sacrificial fuel cell; and an ampere meter measuring the electric current amount occurring in the sacrificial fuel cell at one side of the exhauster.

At one side of the collecting pipe, a water collecting part, which stores water dispensed from the sacrificial fuel cell, is provided.

The water collecting part includes a reductant line water collecting part that is connected to a reductant line inside the sacrificial fuel cell, and an oxidant line water collecting part that is connected to an oxidant line inside the sacrificial fuel cell.

The regenerating means changes a flowing velocity of material unreacted and discharged from the main fuel cell to discharge moisture and impurities inside the main fuel cell through the purge pipe.

The regenerating means includes a regenerating-purpose pipe guiding the flowing direction of the unreacted material passing through the main fuel cell; a regenerating-purpose valve selectively shielding the regenerating-purpose pipe; a sacrificial fuel cell enabling reaction between oxidant and reductant provided from the regenerating-purpose pipe to produce water; and a water collecting part collecting water produced in the sacrificial fuel cell.

The recirculating means includes a gas-liquid separator separating unreacted material from water produced by the reaction of oxidant and reductant inside the main fuel cell; a recirculating pipe guiding unreacted material free of water from the gas-liquid separator into the main fuel cell; and a recirculating pump forcing an unreacted material flowing inside the recirculating pipe.

At one side of the collecting pipe, a collecting pump forcing an unreacted material flowing inside the sacrificial fuel cell is provided.

The collecting pump operates when the inner part of the main fuel cell and the inner part of the sacrificial fuel cell are cut off from each other.

The sacrificial fuel cell generates smaller amount of power, which is selectively being replaced.

The purge pipe selectively opens up in a case when pressure inside the sacrificial fuel cell, which is measured by a pressure gauge, is higher than the set pressure.

The purge pipe selectively opens up when the electric current occurring at the sacrificial fuel cell approaches 0, and the pressure inside the sacrificial fuel cell increases.

The main fuel cell, the supply means, the recirculating means, the detecting means, the regenerating means, the exhausting means and the control means are placed in a closed space.

As detailed and described above, a closed loop type fuel cell system with unreacted material removing function according to the present invention includes a recirculating means recirculating oxidant and reductant discharged from a main fuel cell back into the main fuel cell; a regenerating means for removing moisture and impurities produced when electricity generation efficiency of the main fuel cell is lowered; and an exhausting means for exhausting an oxidant and a reductant, which are unreacted materials that remain inside the regenerating means.

Thus, a benefit of maximizing fuel efficiency is provided even when placed in a closed space such as a submarine. Electricity generation efficiency of the main fuel cell is also maximized by an action of the regenerating path.

Also, the present invention can advantageously block the early discharge of oxidant and reductant by an action of the exhausting means.

Also, the present invention is configured to selectively replace a sacrificial fuel cell provided in the regenerating means.

Thus, by selectively regenerating and enhancing electricity generation efficiency of the main fuel cell when such is lowered, a benefit of improving the durability of a main fuel cell is provided.

Moreover, as the present invention is configured to selectively replace a sacrificial fuel cell, the maintenance of a main fuel cell is easy and the maintainability of the sacrificial fuel cell can be improved.

DESCRIPTION FOR KEY ELEMENTS IN THE DRAWINGS

100: closed loop type fuel cell system
110: main fuel cell
120: supply means
122: fuel tank
124: oxygen tank
130: recirculating means
131: gas-liquid separator
133: recirculating pipe
137: recirculating pump
140: detecting means
150: regenerating means
152: regenerating-purpose pipe
153: check valve
154: regenerating-purpose valve 156: sacrificial fuel cell
158: water collecting part
158': oxidant line water collecting part
158": reductant line water collecting part
160: control means
170: humidifier
180: water storage tank
182: water level adjust pipe
184: distributing valve
185: reductant line distributing valve
186: oxidant line distributing valve
190: drain part
192: drain pipe
194: drain valve
200: exhausting means
210: exhauster
212: exhausting part
214: capacitor
216: capacitor switch
220: short-circuit switch
230: collecting pipe
232: reductant line collecting pipe
233: reductant line purge valve
234: oxidant line collecting pipe
235: oxidant line purge valve
240: purge pipe
250: pressure gauge
252: reductant line pressure gauge
254: oxidant line pressure gauge
260: ampere meter
270: collecting pump
272: reductant line pump
274: oxidant line pump

DETAILED DESCRIPTION

Hereinafter, a construction of a closed loop type fuel cell system will be described with regard to one embodiment, with reference to the accompanying drawings.

And, an embodiment of the present invention will be explained by applying oxygen as an oxidant and by using hydrogen as a reductant.

Figure 1:
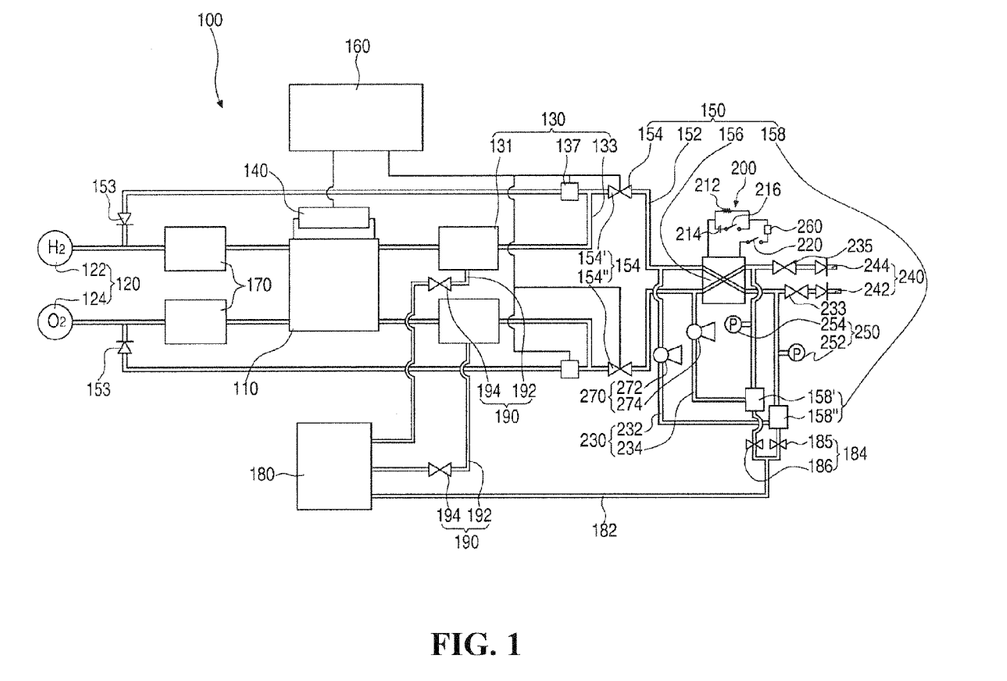
FIG. 1 is a diagram showing a construction of a closed loop type fuel cell system according to the present invention.

FIG. 1 shows a diagram showing a construction of a closed loop type fuel cell system according to the present invention.

As shown in the figure, a closed loop type fuel cell system 100 refers to a system that generates electricity by providing hydrogen ($H_2$) and oxygen ($O_2$) and oxidation-reduction reaction with them, including a main fuel cell 110; a supply means 120 supplying fuel containing hydrogen and oxygen for the main fuel cell 110; a recirculating means 130 recirculating fuel containing hydrogen and oxygen discharged from a main fuel cell 110 back into the main fuel cell 110; a detecting means 140 detecting voltages of a plurality of cells comprising the main fuel cell 110; a regenerating means 150 selectively communicating to one side of the main fuel cell 110 to remove moisture and impurities inside the main fuel cell 110; an exhausting means 200 circulating hydrogen remnant inside the regenerating means 150 through the regenerating means 150 to exhaust the hydrogen; and a control means 160 controlling actions of the supply means 120, the recirculating means 130, the detecting means 140, the regenerating means 150, and the exhausting means 200.

The closed loop type fuel cell system 100 is a system applicable to an apparatus having a closed space such as a submersible vehicle, a submarine, and a spacecraft by one embodiment, including a structure where the main fuel cell 110, the supply means 120, the recirculating means 130, the detecting means 140, the regenerating means 150, the exhausting means 200 and the control means 160 are placed in a closed space to be operable.

More specifically observing the invention, the main fuel cell 110 can be selectively applied with various fuel cells that are within a possible range of generating electricity by being provided with oxidant and reductant as a reactant. An embodiment of the present invention is provided with gas containing hydrogen and oxygen from the supply means 120.

The supplying means 120 is configured to supply gas containing hydrogen and oxygen for the main fuel cell 110, and one embodiment of the present invention includes a fuel tank 122 stocking and selectively supplying hydrogen, and an oxygen tank 124 stocking and selectively furnishing oxygen.

The fuel tank 122 and the oxygen tank 124 communicate with a humidifier 170, and the humidifier 170 communicates with the inner part of the main fuel cell 110. Thus, oxygen and hydrogen inside the fuel tank 122 and the oxygen tank 124 are humidified via the humidifier 170, then supplied into the inner part of the main fuel cell 110.

The humidifier 170 is configured to enable reaction between hydrogen and oxygen supplied into the main fuel cell 110 more easily; herein, specific description of which will be omitted.

On the upper side of the main fuel cell 110, a detecting means 140 is provided. The detecting means 140 is configured to detect voltages of a plurality of cells composing the main fuel cell 110.

That is, the main fuel cell 110 is configured to generate a high voltage by stacking a plurality of cells, and such a plurality of cells generates a different voltage by means of the moisture occurring inside a cell and the change in the current density due to the long-time use, thereby causing differences between cells.

Thus, a detecting means 140 for measuring the moisture amount and the current density change for in-advance monitoring while operating the main fuel cell 110 is provided.

At the right side of the detecting means 140, a recirculating means 130 is provided. The recirculating means 130 is configured to recirculate hydrogen and oxygen discharged, but unreacted, inside a main fuel cell 110, hack into the main fuel cell 110 to maximize availability of fuel.

To do this, the recirculating means 130 includes a gas-liquid separator 131 separating unreacted fuel (hydrogen and oxygen) and water produced by a reaction of hydrogen and oxygen inside the main fuel cell 110, a recirculating pipe 133 guiding the gas separated from the water at the gas-liquid separator 131 into the main fuel cell 110, and a recirculating pump 137 forcing the gas flow inside the recirculating pipe 133.

And, the recirculating means 130 is provided in a humidifier 170 in one piece, each communicating to the fuel tank 122 and the oxygen tank 124.

Figure 3:
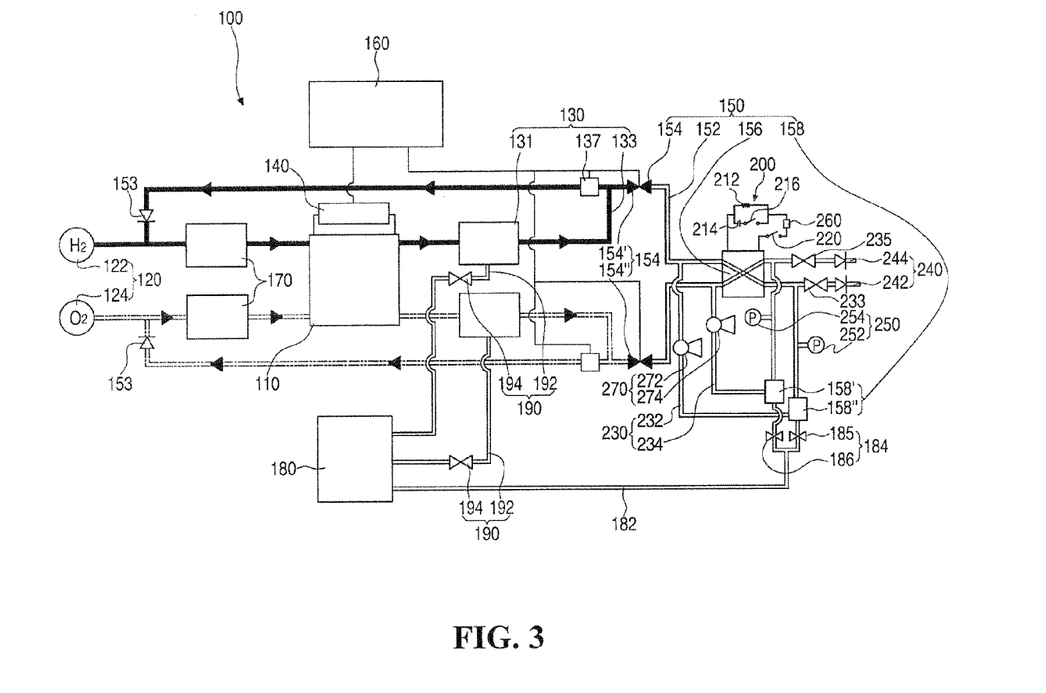
FIG. 3 is an operational state diagram indicating the direction of the flow of hydrogen and oxygen upon an operation of a recirculating means, which is one construction of a closed loop type fuel cell system according to the present invention.

That is, the right upper part and right lower part of the main fuel cell 110 are each connected with the recirculating means 130, in which a recirculating means 130, linked to the right upper part of the main fuel cell 110, recirculates hydrogen to the front end of the humidifier 170, and a recirculating means 130, linked to the right lower part of the main fuel cell 110, recirculates oxygen to the end part of the humidifier 170 (refer to the arrows in FIG. 3).

Thus, gas (hydrogen and oxygen) separated from water at the gas-liquid separator 131 can possibly be recirculated through a recirculating pipe 133.

At one side of the recirculating pipe 133, a check valve 153 is provided. The check valve 153 blocks hydrogen supplied from a fuel tank 122 to inhibit it from influxing a recirculating pipe 133, forcing recirculating gas (hydrogen and oxygen) supplied into the fore-end of the main fuel cell 110 by the recirculating pump 137 to inflow inside a humidifier 170.

In the meantime, the function of the check valve 153 may be configured to be performed by various modified embodiments.

That is, a hydrogen influx supplied from a fuel tank 122 can be shut off by a capillary phenomenon by removing the check valve 153 from the recirculating pipe 133 and differentiating thicknesses of the part connecting between the fuel tank 122 and the humidifier 170 and the part where the check valve 153 is placed.

More particularly, by configuring the pipe thickness of the part where the check valve 153 is placed more thinly and by having a capillary phenomenon occur when the fuel tank 122 supplies fuel to the right side, the function of the check valve 153 can be performed, and it can be configured to substitute a recirculating function by triggering a gas flow into the main fuel cell 110.

And, at the lower side of the gas-liquid separator 131, a drain part 190 is provided. The drain part 190 is configured to guide water to be dispensed into a water storage tank 180 when water dispensed from a main fuel cell 110 increases over a proper water level inside the gas-liquid separator 131.

To this end, the drain part 190 includes a drain pipe 192 communicating the inner part of a gas-liquid separator 131 with the inner part of a water storage tank 180, and a drain valve 194 selectively shielding the inner part of the drain pipe 192.

Thus, water inside the gas-liquid separator 131 may be influxed through a drain pipe 192 to a water storage tank 180 as the drain valve 194 closes and opens, so that the water level inside the gas-liquid separator 131 is constantly maintained.

At the right side of the recirculating means 130, a regenerating means 150 is provided. In case when the voltage of a plurality of cells of the main fuel cell 110, detected by the detecting means 140, is lower than the set voltage, the regenerating means 150 is configured to discharge impurities inside the main fuel cell 110 outside by instantly bypassing the gas influxed inside a recirculating pipe 133.

The regenerating means 150 includes a regenerating-purpose pipe 152 guiding the flowing direction of the gas containing hydrogen or oxygen passed through a recirculating means 130; a regenerating-purpose valve 154 selectively shielding the regenerating-purpose pipe 152; a sacrificial fuel cell 156 producing water by internally allowing reaction of gas containing hydrogen and oxygen provided from the regenerating-purpose pipe 152; and a water collecting part 158 collecting water that is produced in the sacrificial fuel cell 156.

The regenerating-purpose pipe 152 branches from one side of a recirculating pipe 133; thus, connecting to the inner part of the sacrificial fuel cell 156, guiding a gas flow induced by the operation of the regenerating-purpose valve 154.

Thus, the sacrificial fuel cell 156 can be supplied with hydrogen and oxygen at the opening of the regenerating-purpose valve 154.

The regenerating-purpose valve 154 includes a hydrogen regenerating-purpose valve 154' installed in a reductant line flowing with hydrogen and an oxygen regenerating-purpose valve 154" installed in an oxidant line flowing with oxygen.

As can be known from the name of the configuration, the sacrificial fuel cell 156 selectively operates when performance of the main fuel cell 110 is lowered due to inner part moisture or when it discharges impurities. It generates smaller amount of electricity as compared to the main fuel cell 110, and is configured to be selectively replaced.

That is, the sacrificial fuel cell 156 may be supplied with hydrogen and oxygen, for electricity generation; and at one side of a pair of electrodes that guides the flow of electricity, a short-circuit switch 220 is provided for a selective connection. Gas dispensed from the main fuel cell 110 may be consumed inside a sacrificial fuel cell 156 through the connection of the short-circuit switch 220 to become water and other impurities stocked up inside a sacrificial fuel cell 156.

And, the sacrificial fuel cell 156 transforms supplied unreacted material into water through an electrical connection; and at the same time, absorbs and piles up impurities. Therefore, the sacrificial fuel cell 156 performs a function of piling up impurities of small amount that contain reacting gas that is supplied to increase the durability of the main fuel cell 110, and impurities inside a sealed-type fuel cell system.

By doing this, the sacrificial fuel cell 156 protects the main fuel cell 110 and enhances its durability; however, it may be periodically replaced in some cases due to having been used in severe environment condition.

In the meantime, actions of the detecting means 140, the recirculating pump 137, the regenerating-purpose valve 154, the short-circuit switch 220, etc. can be controlled by the control means 160.

That is, the control means 160 operates the generating means 150 in case one or more of each voltage of a plurality of cells is lower than the preset voltage; and in a normal voltage level, it operates the recirculating means 130.

More particularly, in a state when the recirculating pump 137 is operated, the regenerating-purpose valve 154 is shielded, and when the short-circuit switch 220 stays off, the recirculating means 130 may be operated.

On the contrary, in case a certain time has elapsed after the regenerating-purpose valve 154 is shielded and the recirculating pump 137 maintains an inactive state, the regenerating-purpose valve 154 opens a regenerating-purpose pipe 152 while turning the short-circuit switch 220 on, so that the regenerating means 130 may be operated.

Aside from this, the control means 160 is configured to selectively open the drain valve 194 and adjust the water level according to the water level inside the gas-liquid separator 131.

As described above, the inner part of the gas-liquid separator 131 selectively communicates to the water storage tank 180 through a drain pipe 192, and the main fuel cell 110 communicates with the gas-liquid separator 131.

Therefore, the main fuel cell 110 selectively communicates with the inner part of a water storage tank 180 through the operation of the drain valve 194.

Also, the inner part of the water collecting part 158 communicates to the inner part of the water storage tank 180. That is, the water collecting part 158 includes an oxidant line water collecting part 158' collecting water distributed from the oxidant line flowing with oxygen inside the sacrificial fuel cell 156; a reductant line water collecting part 158" collecting water distributed from the reductant line flowing with hydrogen inside the sacrificial fuel cell 156; the oxidant line water collecting part 158'; and the reductant line water collecting part 158", which after being interconnected at the lower side, communicates with the water storage tank 180.

Thus, the lower side of the water collecting part 158 has a water level adjust pipe 182 and a distributing valve 184 for adjusting the water level inside the water collecting part 158.

Both end parts of the water level adjust pipe 182 are connected to communicate with the water collecting part 158 and the inner part of the water storage tank 180, respectively; and the distributing valve 184 selectively shields a branched end part of the water level adjust pipe 182.

More specifically observing the invention, the water level adjust pipe 182, branched at the right upper part, communicates with an oxidant line water collecting part 158' and a reductant line water collecting part 158"; and at the lower side of the oxidant line water collecting part 158' and the reductant line water collecting part 158", a distributing valve 184 is provided. This includes an oxidant line distributing valve 186 and a reductant line distributing valve 185.

And, the oxidant line distributing valve 186 and the reductant line distributing valve 185 are controlled to selectively open the oxidant line water collecting part 158' and the reductant line water collecting part 158".

That is, since there occurs a mix of hydrogen and oxygen when the oxidant line distributing valve 186 and the reductant line distributing valve 185 open at the same time, it is desirable that the oxidant line distributing valve 186 and the reductant line distributing valve 185 selectively open up and not simultaneously open.

Thus, depending on whether the distributing valve 184 opens or not, water inside the oxidant line water collecting part 158' and the reductant line water collecting part 158" may be influxed and stored in a water storage tank 180.

Therefore, water inside the main fuel cell 110, water inside a gas-liquid separator 131, and water inside a water collecting part 158 may all be influxed and stocked into the inner part of the water storage tank 180. Thus, it is possible to install a fuel cell system inside a sealed space.

On the other hand, surrounding the sacrificial fuel cell 156 is an exhausting means 200, a major construction of the present invention. In case when still unreacted hydrogen and oxygen occur during the process of producing water by means of the reaction between the unreacted hydrogen and oxygen in the sacrificial fuel cell 156, the exhausting means 200 acts upon all exhausted unreacted material by re-influxing and enabling reaction between such unreacted hydrogen and oxygen inside the sacrificial fuel cell 156.

And, the exhausting means 200 is configured to store electricity in the process of circulating unreacted hydrogen and oxygen inside the sacrificial fuel cell 156.

Also, together with this, the exhausting means 200 performs to purge foreign substance inside a sacrificial fuel cell 156, in case when electric current approaches 0 even if unreacted hydrogen and oxygen circulate inside the sacrificial fuel cell 156 or when pressure inside the sacrificial fuel cell 156 gradually increases.

Hereinafter, a configuration of the exhausting means 200 will be described in detail with reference to the accompanying FIG. 2.

Figure 2:
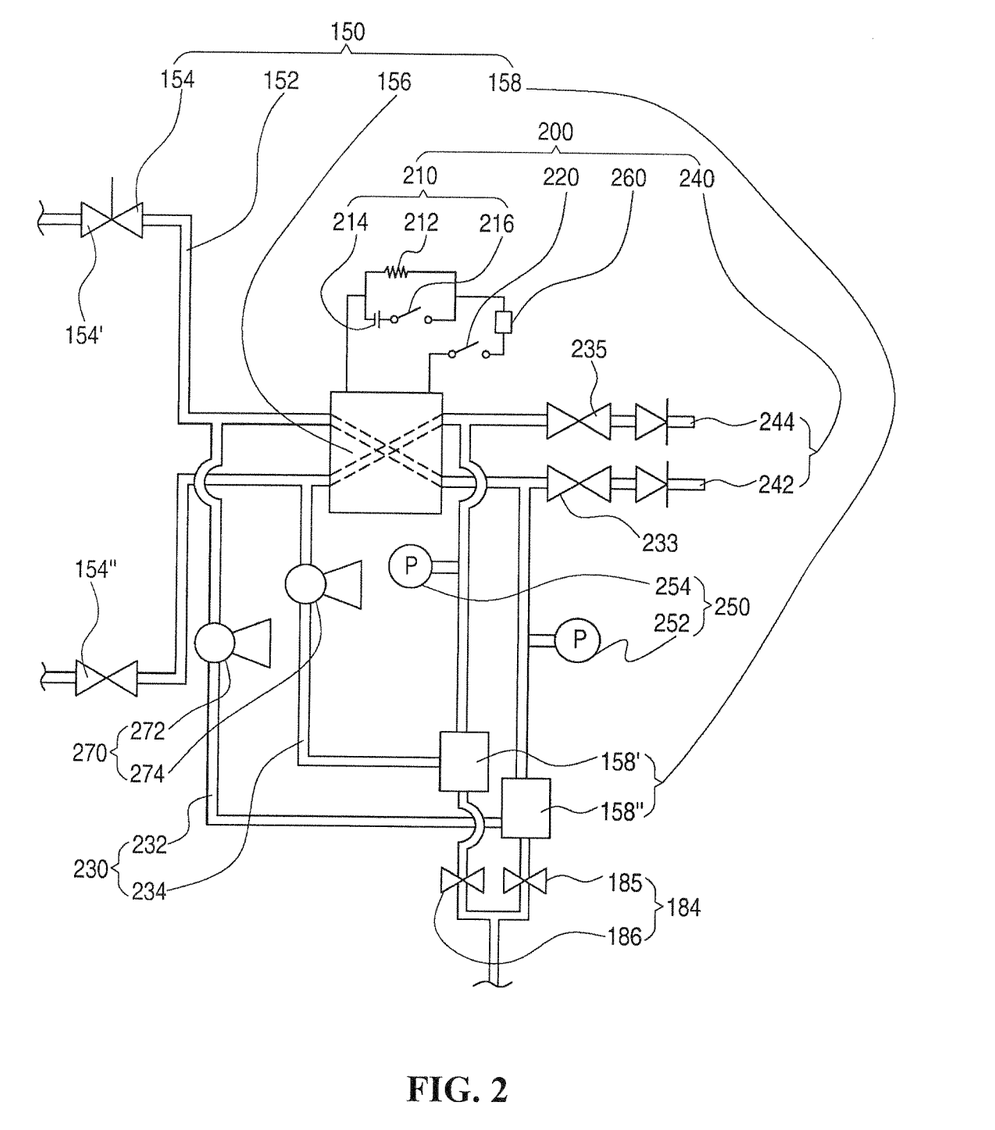
FIG. 2 is a diagram indicating a construction of an exhausting means, which is a major construction of a closed loop type fuel cell system according to the present invention.

FIG. 2 shows a diagram indicating a configuration of an exhausting means 200, one construction of a closed loop type fuel cell system according to the present invention.

As shown in the figure, the exhausting means 200 includes an exhauster 210 storing or extinguishing electricity generated in the sacrificial fuel cell 156 to exhaust hydrogen and oxygen inside the sacrificial fuel cell 156; the aforementioned short-circuit switch 220; a collecting pipe 230 guiding unreacted hydrogen and oxygen coming from and back into the sacrificial fuel cell 156; a purge pipe 240 branching from the collecting pipe 230 and selectively opening the inner part of the sacrificial fuel cell 156; a pressure gauge 250 measuring the pressure inside the sacrificial fuel cell 156; and an ampere meter 260 measuring the amount of the electric current occurring in the sacrificial fuel cell 156 at one side of the exhauster 210.

The exhauster 210 is configured to exhaust unreacted hydrogen and oxygen inside a sacrificial fuel cell 156 when unreacted hydrogen and oxygen are supplied into the sacrificial fuel cell 156, thereby storing the occurring current, or selectively connecting the anode and cathode of the sacrificial fuel cell 156 to consume produced current so that it approaches 0.

The exhauster 210 is provided with a short-circuit switch 220 connected to the electrode of the sacrificial fuel cell 156, and at the upper side of the short-circuit switch 220, an ampere meter 260 may be placed.

And, the short-circuit switch 220 selectively connects to an exhauster 212 and a capacitor 214, and the capacitor 214 selectively connects to the sacrificial fuel cell 156 through the capacitor switch 216.

The collecting pipe 230 guides the transfer direction of water and unreacted hydrogen and oxygen dispensed from the sacrificial fuel cell 156, connecting it to the input part of the sacrificial fuel cell 156 via the water collecting part 158.

More specifically, the collecting pipe 230 includes a reductant line collecting pipe 232 guiding the transfer of the hydrogen coming out via the reductant line water collecting part 158" into the sacrificial fuel cell 156, and an oxidant line collecting pipe 234 guiding the transfer of the oxygen coming out via the oxidant line water collecting part 158' into the oxidant line inside the sacrificial fuel cell 156.

And, one side of each of the oxidant line collecting pipe 234 and the reductant line collecting pipe 232 has an oxidant line purge valve 235 and a reductant line purge valve 233.

The oxidant line purge valve 235 and the reductant line purge valve 233 selectively shield a reductant line purge pipe 242 and an oxidant line purge pipe 244 each branched from an oxidant line collecting pipe 234 and a reductant line collecting pipe 232, thereby guiding hydrogen and oxygen to influx to a sacrificial fuel cell 156 along the oxidant line collecting pipe 234 and the reductant line collecting pipe 232.

That is, water among unreacted hydrogen and oxygen, and water dispensed from the sacrificial fuel cell 156 are collected at the water collecting part 158; and the unreacted hydrogen and oxygen may be influxed and reacted again inside the sacrificial fuel cell 156 along the collecting pipe 230.

At one side of the collecting pipe 230, a pressure gauge 250 is provided to measure pressure inside the sacrificial fuel cell 156.

And, the pressure gauge 250 also includes a reductant line pressure gauge 252 and an oxidant line pressure gauge 254, measuring pressure inside the sacrificial fuel cell 156 through the reductant line collecting pipe 232 and the oxidant line collecting pipe 234.

At the upper side of the collecting pipe 230, a collecting pump 270 is provided.

The collecting pump 270 is configured to forcibly influx unreacted hydrogen and oxygen inside the sacrificial fuel cell 156 back into it. It includes a reductant line pump 272 and an oxidant line pump 274, installed to communicate to the inner part of the collecting pipe 230 in order to coerce gas flow.

The purge pipe 240 branches from one side of the collecting pipe 230, selectively opening when electricity generation is impossible due to the increase of unreacted material inside the sacrificial fuel cell 156.

That is, the purge pipe 240 maintains a closed state when unreacted material inside a sacrificial fuel cell 156 circulates and is exhausted by an action of the exhausting means 200. However, gas unused in electricity generation, among materials existing inside the sacrificial fuel cell 156, may stay inside the sacrificial fuel cell 156.

As one embodiment, when gas excludes unreacted material passing through a polymer membrane inside the sacrificial fuel cell 156, the pressure inside the sacrificial fuel cell 156 is higher than the set pressure; the pressure measured by the pressure gauge 250 increases but the current measured by the ampere meter 260 approaches 0. At this stage, the remaining gas may be discharged by selectively opening the purge pipe 240.

As another embodiment, to discharge impurities and moisture inside the sacrificial fuel cell 156 in a short time, the purge pipe 240 opens at the same time as the regenerating-purpose valve 154, the oxidant line purge valve 235 and the reductant line purge valve 233, thereby providing hydrogen and oxygen of high pressure from the main fuel cell 110, and in the process, discharging the moisture, impurities and gas (nitrogen, etc.) accumulated inside the sacrificial fuel cell 156.

And, the purge pipe 240 consists of a reductant line purge pipe 242 and an oxidant line purge pipe 244, capable of independent opening control of the reductant line collecting pipe 232 and the oxidant line collecting pipe 234.

Hereinafter, a procedure of generating electricity by operating the closed type fuel cell system 100 will be described with reference to arrows of FIG. 3.

FIG. 3 shows an operational state diagram indicating the direction of the flow of the hydrogen and oxygen upon operation of the recirculating means, one configuration in a closed loop type fuel cell system according to the present invention.

As shown in the figure, in order for the closed loop type fuel cell system 100 to generate electricity, the supplying means 120 supplies hydrogen and oxygen into the humidifier 170. The main fuel cell 110, being supplied with oxygen and hydrogen humidified through the humidifier 170, generates electricity.

And, when the recirculating pipe 133 opens, the recirculating pipe 133 guides the flow of gas (oxygen and hydrogen), so that hydrogen and oxygen that are unreacted but dispensed in the main fuel cell 110 pass through the gas-liquid separator 131 to be separated from water. These are then recirculated along the humidifier 170 end part.

At this time, the regenerating-purpose valve 154 shields a regenerating-purpose pipe 152 to block gas influx, and the detecting means 140 continuously measures voltages of a plurality of cells composing the main fuel cell 110. Also, the short-circuit switch 220 stays off.

Thus, recycling of the hydrogen and oxygen by an action of a recirculating means 130 as described above can be maximized.

Hereinafter, in case one or more voltages of each of the plurality of cells detected by the detecting means 140 becomes lower than the preset voltage, thereby operating the regenerating means 150, the flowing gas will be described with reference to the accompanying FIG. 4.

Figure 4:
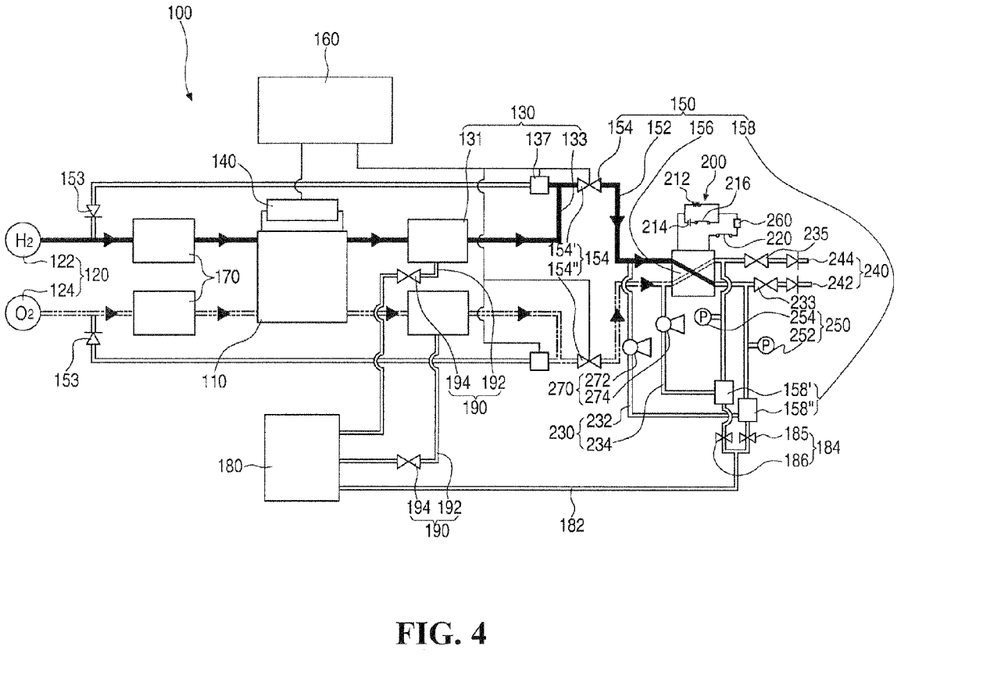
FIG. 4 is an operational state diagram indicating the direction of the flow of hydrogen and oxygen upon an operation of a regenerating means, which is one construction of a closed loop type fuel cell system according to the present invention.

FIG. 4 shows an operational state diagram indicating the direction of the flow of hydrogen and oxygen upon the operation of the regenerating means 150, one construction of one embodiment of a closed loop type fuel cell system according to the present invention.

As shown in the figure, as electricity generating efficiency of the main fuel cell 110 lowers, the regenerating means 150 operates to enhance the electricity generating efficiency and durability of the main fuel cell 110.

According to an operation of one embodiment, the control means 160 shields the regenerating-purpose valve 154, and the short-circuit switch 200 turns on. Also, it controls the action of the recirculating pump 137, stopping it from operating.

And, when hydrogen and oxygen are provided from the fuel tank 122 and the oxygen tank 124, maintaining a closed state of the regenerating-purpose valve 154, high pressure is produced.

Thereafter, when a certain time elapses, by opening a closed regenerating-purpose valve 154 instantly, impurities inside the main fuel cell 110 moves instantly towards the sacrificial fuel cell 156 together with hydrogen and oxygen.

According to an operation of another embodiment, when hydrogen and oxygen recirculate inside the main fuel cell 110 by operation of the recirculating pump 137, high pressure stays inside the main fuel cell 110. At this time, by opening the regenerating-purpose valve 154, thus instantly forcing a gas flow, impurities inside the main fuel cell 110 may be transferred together with hydrogen and oxygen into the sacrificial fuel cell 156.

At this time, impurities and unreacted material discharged from the main fuel cell 110 are separated from each other through a gas-liquid separator 131, in which gas swiftly moves to the regenerating-purpose pipe 152, and inflows into the sacrificial fuel cell 156.

Thus, the sacrificial fuel cell 156 generates electricity; the generated electricity, because the short-circuit switch 200 stays ON, is grounded. Water is then produced inside the sacrificial fuel cell 156.

Water produced in the sacrificial fuel cell 156 flows and is stored in the water collecting part 158, and an influx to the water storage tank 180 can be possible by the selective opening of the distributing valve 184.

According to such an action, water and impurities inside the main fuel cell 110 are accumulated into the sacrificial fuel cell 156, so that when impurities inside the main fuel cell 110 decrease, a regeneration with enhanced durability is possible in the end.

Also, the sacrificial fuel cell 156 produces water produced by all reacting hydrogen and oxygen, thereby blocking the discharge of hydrogen and oxygen. This possibly inhibits accidents such as explosion.

More particularly, when hydrogen and oxygen react among unreacted materials using the sacrificial fuel cell 156 to regenerate the main fuel cell 110, moisture and impurities inside the sacrificial fuel cell 156 are not all discharged outside; some remain so that such moisture and impurities pile up, inhibiting reaction between unreacted hydrogen and oxygen.

That is, moisture and impurities accumulated inside the sacrificial fuel cell 156 block the reaction site and thus, these can be stagnant without being consumed inside. Consequently, such moisture and impurities lower the reaction of unreacted hydrogen and oxygen inside the sacrificial fuel cell 156.

To solve such a problem, operating the exhausting means 200 is necessary to increase reaction inside the sacrificial fuel cell 156.

That is, by operating the exhausting means 200, moisture that remained inside the sacrificial fuel cell 156 is activated; by re-influxing unreacted hydrogen and oxygen inside the sacrificial fuel cell 156 back into the sacrificial fuel cell 156 using a collecting pump 270, the reaction of the sacrificial fuel cell 156 can be increased.

Hereinafter, the action of the exhausting means 200 will be described with reference to arrows of the accompanying FIG. 5.

Figure 5:
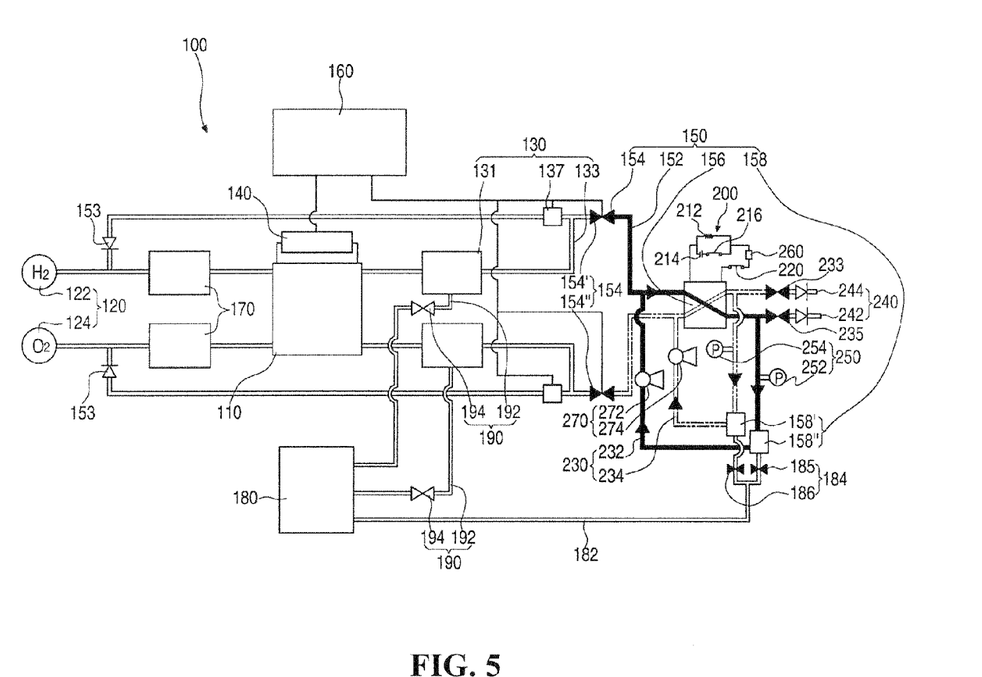
FIG. 5 is an operational state diagram indicating a direction of the flow of hydrogen and oxygen upon an operation of an exhausting means, which is one construction of a closed loop type fuel cell system according to the present invention.

FIG. 5 shows an operational state diagram indicating the direction of the flow of hydrogen and water upon the operation of the exhausting means 200, one construction in a closed loop type fuel cell system according to the present invention.

As shown in the figure, to exhaust remaining hydrogen inside the sacrificial fuel cell 156 using the exhausting means 200, it is necessary to pass through a procedure of dispensing unreacted hydrogen and oxygen and moisture and impurities, and a procedure of re-supplying only unreacted hydrogen and oxygen among dispensed materials into the sacrificial fuel cell 156, and to exhaust.

For this action, the regenerating-purpose valve 154 and the oxygen line purge valve 235, the reductant line purge valve 233, the oxygen line distributing valve 186, and the reductant line distributing valve 185 are closed; one or more of the capacitor switches 216 and the short-circuit switch 220 are in contact; and the collecting pump 270 operates.

By means of the operation of the collecting pump 270, unreacted hydrogen, impurities and water remnant inside the sacrificial fuel cell 156 shift along the collecting pipe 230; and through the water collecting part 158, moisture and impurities are filtered, and material containing unreacted hydrogen of considerable amounts influxes inside the sacrificial fuel cell 156.

At this time, by inducing a flow into the inner part of the sacrificial fuel cell 156, water and impurities blocking the reaction site are removed and thus, a reaction inside the sacrificial fuel cell 156 is promoted.

That is, as shown in the figure, when the short-circuit switch 220 and the capacitor switch 216 turn "on", electricity that occurred inside the sacrificial fuel cell 156 will be stored into the capacitor 214.

On the contrary, when the short-circuit switch 220 stays "on", and a capacitor switch 216 stays "off", the capacitor 214 does not store electricity but the electricity will be exhausted by the exhausting part 212. In an embodiment of the present invention, resistance may be applied to the exhausting part 212.

In the meantime, when pressure inside a sacrificial fuel cell 156 measured by the pressure gauge 250 increases over the set pressure as gas, such as impurity gas remnant inside the sacrificial fuel cell 156, becomes stagnant, and the current value measured by the ampere meter approaches 0. The purge pipe 240 will then be opened to discharge the impure gas.

That is, to better enhance regeneration of the main fuel cell 110, gas, impurities, etc. stagnant inside the sacrificial fuel cell 156 should be discharged outwards.

At this time, to determine whether or not the purge pipe 240 should be opened, pressure measured by the pressure gauge 250 should be compared with the pre-defined pressure, which, preferably, needs to be changed and set based on the normal pressure of a closed space where the fuel cell system is installed.

When opening the purge pipe 240, the reductant line purge valve 233 and the oxygen line purge valve 235 are opened, and the end part of the purge pipe 240 is provided with a cheek valve so that the inflow of external gas into the purge pipe 240 is blocked.

A closed loop type fuel cell system 100 is provided with an unreacted material removing function, and includes a main fuel cell 110 that generates electricity by promoting reaction between oxidant and reductant; a supply means 120 supplying fuel containing hydrogen and oxygen for the main fuel cell 110; a recirculating means 130 re circulating fuel containing hydrogen and oxygen discharged from the main fuel cell 110 back into the main fuel cell 110; a detecting means 140 detecting voltages of a plurality of cells comprising the main fuel cell 110; a regenerating means 150 selectively communicating to one side of the main fuel cell 110 to remove moisture and impurities inside the main fuel cell 110; an exhausting means 200 circulating hydrogen remnant inside the regenerating means 150 through the regenerating means 150 to exhaust the hydrogen; and a control means 160 controlling actions of the supply means 120, the recirculating means 130, the detecting means 140, the regenerating means 150, and the exhausting means 200. According to the present invention, by removing moisture and impurities when using oxidant and reductant in a closed loop environment, the electricity generation efficiency and durability of the main fuel cell are enhanced.

The scope of the present invention as described above is not limited to the exemplified embodiments, and it would be apparent to those skilled in the art that various changes of the present invention are made within the scope of the invention technology.

For example, while an embodiment of the present invention has applied oxygen as an oxidant, and hydrogen as a reductant, it is understood that the invention is not limited thereto and can be applied to methanol and hydrazine in the context of generating electricity by oxidation-reduction reaction.

What is claimed is:

1. A closed loop type fuel cell system with unreacted material removing function, comprising:
a main fuel cell reacting an oxidant and a reductant to generate electricity;
a supply member configured to supply material containing the oxidant and the reductant for the main fuel cell;
a recirculating member configured to recirculate unreacted material discharged from the main fuel cell back into the main fuel cell;
a detecting member configured to detect voltages of a plurality of cells composing the main fuel cell;
a regenerating member configured to selectively communicate to one side of the main fuel cell to remove moisture and impurities inside the main fuel cell;
an exhausting member configured to circulate unreacted material remnant inside the regenerating member through the regenerating member to exhaust the unreacted material; and
a control member configured to control actions of the supply member, the recirculating member, the detecting member, the regenerating member, and the exhausting member;
wherein the exhausting member includes a collecting pipe and one side of the collecting pipe has a collecting pump forcing the unreacted material to flow into a sacrificial fuel cell; and
wherein the exhausting member includes an exhauster configured to store or extinguish electricity generated in the sacrificial fuel cell to exhaust the oxidant and the reductant inside the sacrificial fuel cell.

2. The system according to claim 1, wherein the regenerating means includes the sacrificial fuel cell enabling reaction between the oxidant and the reductant, which are the unreacted material provided from the main fuel cell, to generate electricity.

3. The system according to claim 2, wherein the exhausting member recirculates unreacted material passed through the sacrificial fuel cell back into the sacrificial fuel cell.

4. The system according to claim 3, wherein one side of the collecting pipe has a water collecting part storing water dispensed from the sacrificial fuel cell.

5. The system according to claim 4, wherein the water collecting part includes a reductant line water collecting part connected to a reductant line inside the sacrificial fuel cell, and an oxidant line water collecting part connected to an oxidant line inside the sacrificial fuel cell.

6. The system according to claim 2, wherein the recirculating member includes:
a gas-liquid separator separating water from unreacted material discharged from the main fuel cell;

a recirculating pipe guiding unreacted material free of water from the gas-liquid separator into the main fuel cell; and a recirculating pump forcing the unreacted material flowing inside the recirculating pipe.

7. The system according to claim 2, wherein the sacrificial fuel cell generates smaller amount of power, and can be selectively replaced.

8. The system according to claim 2, wherein the purge pipe selectively opens when electric current occurring in the sacrificial fuel cell approaches 0, and pressure inside the sacrificial fuel cell increases.

9. The system according to claim 1, wherein the regenerating member includes:

a regenerating-purpose pipe guiding the flowing direction of unreacted material passed through the main fuel cell;

a regenerating-purpose valve selectively shielding the regenerating-purpose pipe;

a sacrificial fuel cell promoting reaction between the oxidant and the reductant provided from the regenerating-purpose pipe to produce water; and a water collecting part collecting water that is produced in the sacrificial fuel cell.

10. The system according to claim 1, wherein the main fuel cell, the supply member, the recirculating member, the detecting member, the regenerating member, the exhausting member, and the control member are placed in a closed space.

* * * * *